United States Patent [19]

Rhoton

[11] 4,372,015
[45] Feb. 8, 1983

[54] BLIND HOLE CLAMPING TOOL

[75] Inventor: William A. Rhoton, Costa Mesa, Calif.

[73] Assignee: The Boeing Company, Seattle, Wash.

[21] Appl. No.: 263,332

[22] Filed: May 13, 1981

[51] Int. Cl.³ ............................................. A44B 17/00
[52] U.S. Cl. .................................................. 24/221 R
[58] Field of Search ........................ 24/221 R, 221 A; 411/337, 368

[56] References Cited

U.S. PATENT DOCUMENTS 3,443,783  5/1969  Fisher ............................... 24/221 R
3,956,803  5/1976  Leitner ............................. 24/221 R Primary Examiner—Robert Peshock
Attorney, Agent, or Firm—Conrad O. Gardner; Nicolaas DeVogel; B. A. Donahue

[57] ABSTRACT

A blind hole clamping tool which provides for clamping to an apertured panel having only one side of the panel accessible, by positioning the tool locator disk in the aperture of the panel while utilizing the knurled knob to rotate the eccentrically disposed clamp portion so that it engages the rear side of the panel, whereupon the hand knob at the end of a knurled and threaded rod opposite the eccentric clamp end of the rod is rotated to clamp the parts firmly in position.

3 Claims, 4 Drawing Figures

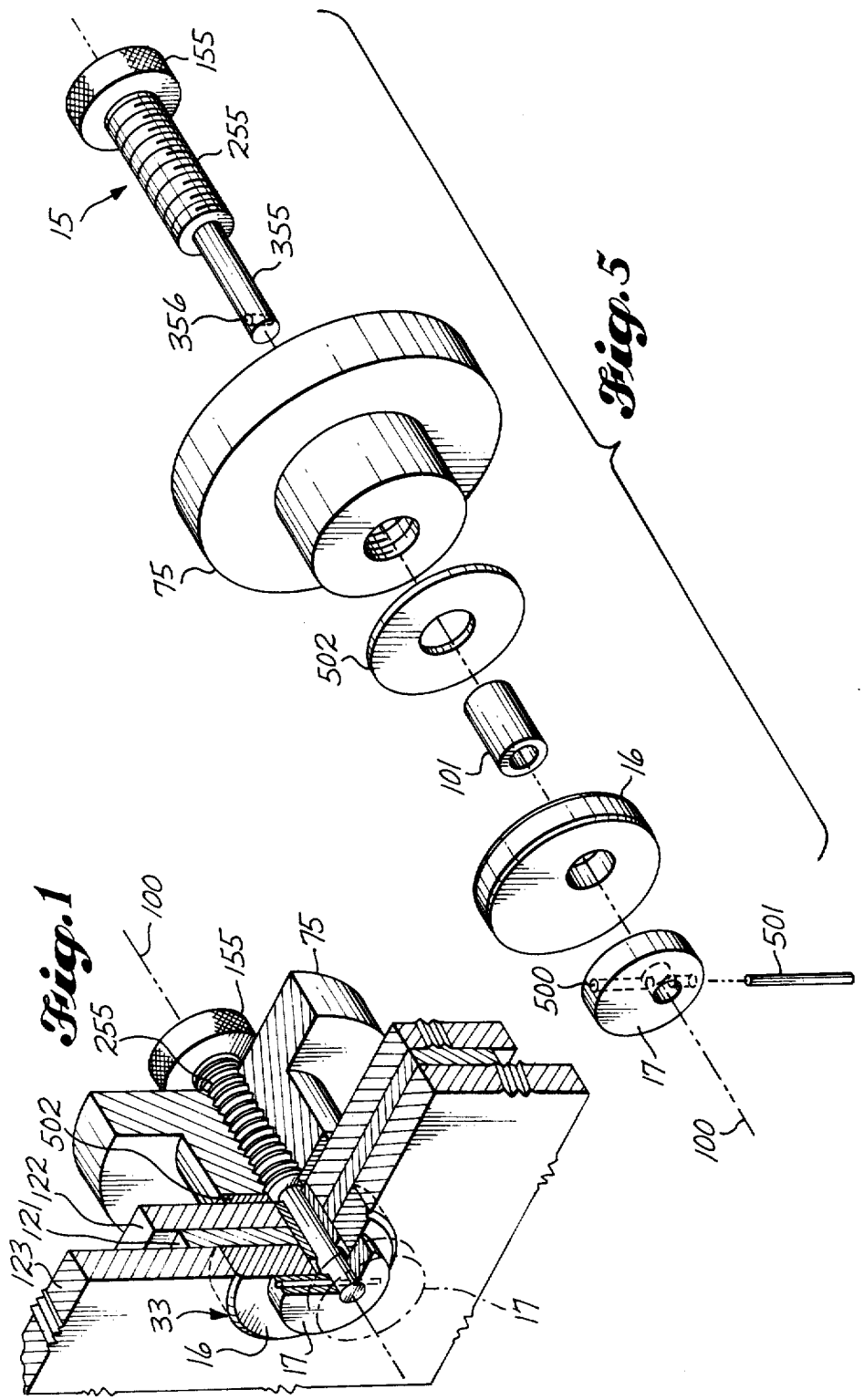

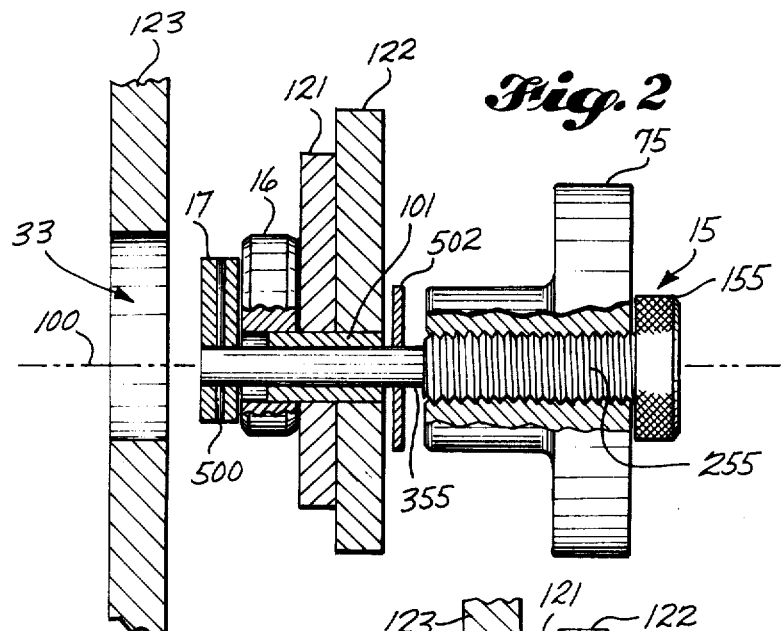
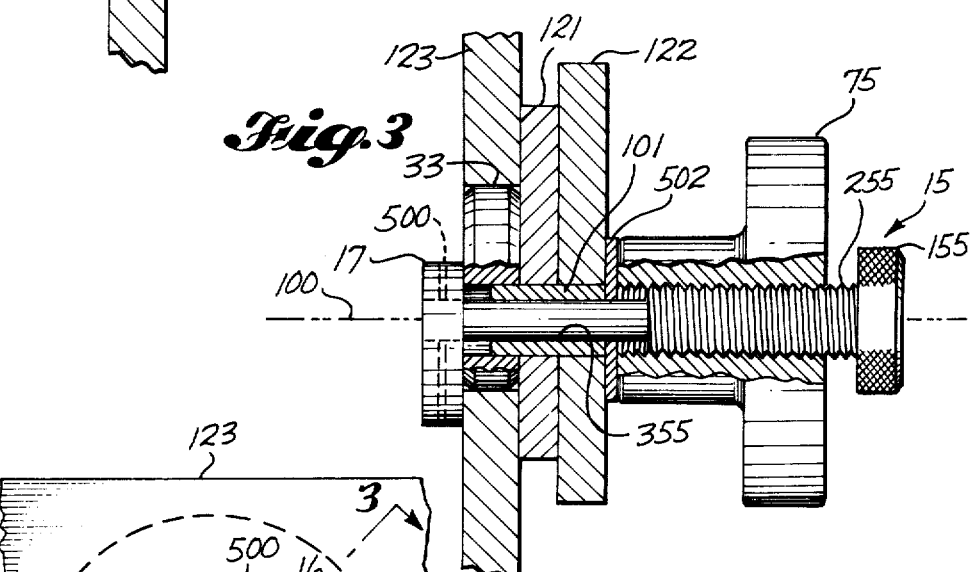
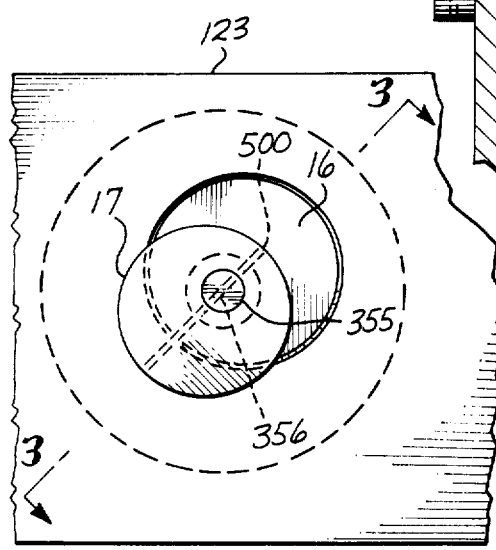

BLIND HOLE CLAMPING TOOL

The present invention relates to devices utilized for clamping mechanical parts together during installation of and assembly of such parts to form an integral structure and more particularly to a blind hole clamp for enabling the installation of various mechanical parts by a single mechanic or operator.

Heretofore, the patent literature has shown various types of clamping devices, fastening devices, connecting pins and bushings, as shown, for example, in U.S. Pat. Nos. 1,785,709 to Campau, issued Dec. 16, 1930; 2,403,247 to Sullivan, issued July 2, 1946; and 3,956,803 to Leitner, issued May 18, 1976. While various clamping techniques are shown in the aforementioned prior art patents, in contrast thereto the present blind hole clamp enables a single mechanic to clamp a plurality of sheets of material without the use of a nut or screw but through use of a hand wheel in accomplishing the clamping force.

In accordance with a preferred embodiment of the present invention, a blind hole clamping tool assembly comprises a knurled and threaded rod having an eccentric clamp end portion and a knob end portion for rotating the rod to exercise a clamping force by the clamp end portion against the parts disposed between the clamp end portion and a wheel portion concentrically disposed about the rod between the parts being clamped and the knob end portion of the rod.

It is accordingly an object of the present invention to provide a blind hole clamping tool assembly which permits jig location for drilling mounting holes in a structure without access by an operator to the rear side of the structure to locate and drill the mounting holes in the structure.

A full understanding of the invention, and of its further objects and advantages and the several unique aspects thereof, will be had from the following description when taken in conjunction with the accompanying drawings in which:

FIG. 1 is a partial cutaway perspective view of the present blind hole clamping tool assembly disposed in clamped position about the structure and jig for drilling and locating mounting holes in the structure;

FIG. 2 is illustrative of the present blind hole clamping tool assembly carrying a jig structure prior to insertion of clamp locator into the structure;

FIG. 3 is a cross-sectional view of the blind hole clamping tool assembly as shown in FIG. 2 however showing the locator in final position in the structure with eccentric clamp member clamping jig and structure together;

FIG. 4 is a backside view of the clamped assembly of FIG. 3 deemed helpful in showing location of clamp locator in the apertured structure and eccentric clamping member in clamped position against the back of the structure;

FIG. 5 is an exploded view of the embodiment of the present blind hole clamping tool assembly shown in FIGS. 1 through 4 showing individual parts of the assembly in detail.

Turning now to the perspective view of FIG. 1, it can be seen how the present blind hole clamping tool assembly is utilized to clamp a jig formed by members 121 and 122 against the inner working surface of structural member 123. The jig assembly comprising members 121 and 122 can be seen to be held in clamped position between a washer 502 concentrically disposed about the central axis of the tool 100, and eccentrically disposed clamping member 17 of the tool also concentrically disposed about the central axis 100 of the tool. Clamp locator member 16 having a disk-like cylindrical shape and also concentrically disposed about the central axis 100 of the tool is seen seated in the aperture 33 of structural member 123 in which mounting holes for equipment are to be drilled utilizing the jig members 121 and 122. Further key operational and adjusting functions of the tool of FIG. 1 are performed by wheel member 75 which is utilized to tighten up and apply the clamping forces between washer member 502 and eccentric clamping member 17; and, knob end 155 which enables turning of threaded rod portion 255 to provide circular motion of eccentric clamping member 17.

Turning now to the sectional view of FIG. 2 where the blind hole clamping tool assembly including jig members 121 and 122 is seen prior to positioning of clamp locator member 16 into hole 33, it can be seen that eccentric clamping member 17 of circular disk shape is located in a position concentric with disk-shaped clamp locator member 16. Now, upon study of FIG. 3, it can be seen that the present blind hole clamping tool assembly utilizes clamp locator member 16 as a guide which is inserted into hole 33 of structural member 123 whereupon it can be seen in a comparison of FIGS. 3 and 2 that circular disk-shaped clamping member 17 is dropped from a concentric position with respect to clamp locator member 16 into an eccentrically disposed position with respect to the central axis 100 of the tool. Rotation down into the position shown in FIG. 3 of eccentrically disposed clamping member 17 is accomplished through rotation of end knob portion 155 of rod member 355. A rear view or backside view of structural member 123 given in FIG. 4 shows the eccentric disposition of clamping member 17 with respect to clamp locator member 16.

Turning now to FIG. 5 and an exploded view showing detail of parts of the present blind hole clamping tool assembly, it can be seen that a pin member 501 is utilized to secure clamping member 17 to the end of rod member 355 opposite the knob end 155. Pin member 501 passes through hole 500 in clamping member 17 and then through hole 356 in the end of rod member 355. Wheel member 75 is internally threaded and disposed about the threaded portion 255 of rod 355 and utilized to increase clamping pressure in the assembly. In sequence between clamping member 17 and wheel member 75, all concentrically disposed in sequence about the unthreaded portion of rod 355 are, cylindrically shaped, disk-like locator member 16, bushing 101, and washer 502.

In operation as hereinbefore discussed with respect to the description of FIGS. 1 through 4, the present blind hole clamping tool is located by first turning knob end portion 155 of knurled and threaded rod 255 to a line clamping member 17 concentrically ahead of clamp locator member 16 thereby enabling clamping member 17 to clear the blind hole and permit seating of clamp locator 16 within blind hole 33. Subsequent to seating of clamp locator member 16 within blind hole 13, knob end 155 is further rotated to eccentrically dispose clamp member 17 on the back surface of structure 123 as shown in FIG. 4. The full clamping action is then achieved by subsequent rotation of wheel 75 thereby drawing wheel 75 and washer 502 towards eccentrically disposed clamp member 17 thereby clamping jig parts 121 and 122 and structural member 123 together.

What is claimed is:

1. A blind hole clamping tool having a central axis comprising:
   a rod member disposed along the central axis, said rod having a knob end portion and a disk-shaped clamp member attached to a further end portion, said rod having a threaded portion intermediate said knob end portion and said disk-like clamp member;
   a bushing concentrically disposed about said rod member between said disk-shaped clamp member and said threaded portion of said rod member;
   a wheel-shaped member concentrically disposed about said threaded portion of said rod member; and,
   a disk-shaped clamp locator, and disk-shaped wheel member concentrically disposed about said bushing between said disk-shaped clamp member and said wheel-shaped member.

2. The invention according to claim 1 wherein said wheel-shaped member includes an internal threaded portion disposed concentrically about said threaded portion of said rod for applying a clamping force between said wheel-shaped member and said disk-shaped clamp member.

3. The invention according to claim 1 wherein said knob end portion is coupled to said clamp end portion through said rod to provide rotation of said clamp end portion eccentrically about said central axis of said tool.

* * * * *